Figures 1, 2:
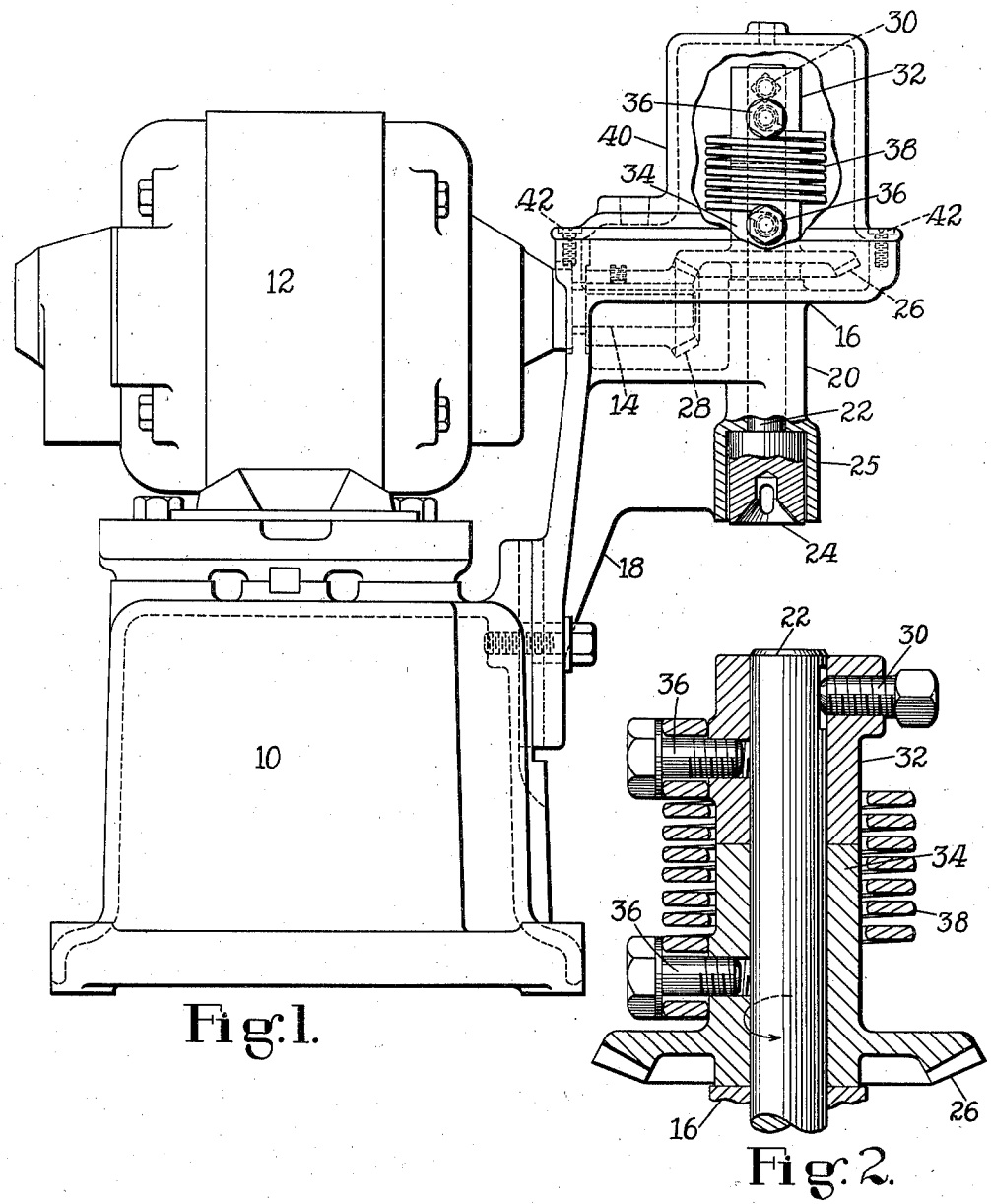

Aug. 16, 1938.   A. J. COCOZELLA ET AL   2,126,735
MACHINE FOR ROTATING SCREWS
Filed Aug. 11, 1936

INVENTOR-
Albert J. Cocozella
Anthony Cocozella Jr
By their attorney
Victor Cobb Patented Aug. 16, 1938

2,126,735

UNITED STATES PATENT OFFICE 2,126,735

MACHINE FOR ROTATING SCREWS

Albert J. Cocozella and Anthony Cocozella, Jr., Lynn, Mass., assignors to United Shoe Machinery Corporation, Paterson, N. J., a corporation of New Jersey Application August 11, 1936, Serial No. 95,437

2 Claims. (Cl. 144—32)

This invention relates to machines by which turning forces are applied to screws, it being herein disclosed in connection with an apparatus for removing screws from work in which they have been inserted.

Letters Patent of the United States No. 1,611,154, Bertrand, December 21, 1926, has as its subject a machine by which there may be removed screws employed to attach temporarily heels to lasted shoes. In this machine, a screw-engaging chuck is in continuous rotation, and when the head of a screw to be removed is brought into contact with it and the turning force is applied, a considerable shock may result which is transmitted to the work, to the machine and to the hands of the operator. An object of the present invention is to absorb or cushion this shock by an arrangement which is strong, simple and effective.

In the attainment of the above object there is combined with a rotatable driving member, as a gear, and a driven spindle provided with a gear rotatable about it and with a screw-engaging chuck, a spring connecting the gears to transmit the driving force to the chuck. When the chuck is in turning relation to the screw, the torque will be applied first to the spring, and, as this is put under stress, will be transmitted yieldably with gradually increasing efficacy to the screw to accomplish its removal, this being with no abrupt or strain-producing effect. As herein illustrated, the spindle has secured to it a collar, between which and a driving gear a torsion-spring is connected. The spring, collar and gear, and also a motor-pinion through which the gear is driven, are all enclosed in a casing, so the hands of the operator and other objects are protected against injury by moving parts, yet easy access may be had to these upon removal of a cover of the casing.

The chuck may also be guarded by a hood upon the casing, the hood being preferably integral with the casing and both hood and casing with a bracket by which parts are carried upon a base.

A particular embodiment of the invention is illustrated in the accompanying drawing, in which Fig. 1 represents the improved apparatus in side elevation, with parts broken away, and Fig. 2, an enlarged vertical section through the spring and its connections.

At 10 appears a base upon which is mounted an electric or other motor 12. A horizontal shaft 14 of this motor extends into a casing 16 which is formed upon a bracket 18 rising from the base. Journaled vertically in a bearing at 20 in the lower portion of the casing is a spindle 22 having at its lower extremity a chuck 24, in which is a depression and slot for engagement with the head of a fastening, as described in the previously mentioned patent. This chuck turns within a hood 25 formed upon the bracket 18, so it is accessible only from below. Contact of the upper surface of the chuck with the top of the hood takes the thrust produced by the application of the work. Rotatable about the spindle is a bevel-gear 26 meshing with a bevel-pinion 28 fast upon the motor-shaft 14, this gearing being enclosed in the casing 16. About the upper extremity of the spindle 22 is secured by a set-screw 30 a collar 32. Attached at its opposite extremities by screws 36, 36 to the collar and to an upwardly elongated hub 34 upon the gear 26 is a torsion-spring 38. This spring is retained throughout its length against lateral displacement by the collar 32 and the hub 34 which are within it. The casing 16 is relatively shallow, so the spring and the portions of the elements to which it is joined rise above it. These, however, are completely surrounded by a cover 40 attached to the top of the casing by screws 42. Removal of this cover gives access to all the enclosed parts for inspection or renewal.

Assuming that the apparatus is to be employed to remove temporary attaching screws from lasted shoes and their adhesively attached heels, the direction of rotation of the motor-shaft 14 will be such that the spindle 22 is turned contraclockwise, as viewed from above. With the chuck 24 in continuous rotation, the operator takes a shoe with its attached heel and placing the head of the temporary screw beneath the chuck 24, raises it until the head of the screw is engaged by the chuck-slot. As the screw, held against turning with the work by the operator, resists backing off under the influence of the chuck, the action of the gear 26 is first to contract the convolutions of the spring 38, applying a gradually increasing force to the screw. Then, when the resistance offered by the spring exceeds that of the screw, the rotation of said screw and its withdrawal from the work begins, without application thereto, to the hands of the operator or to the machine of abrupt, harmful stresses. Particularly are the long stems of the temporary heel-attaching screws relieved of strains which may cause them to be twisted off.

Having described our invention, what we claim as new and desire to secure by Letters Patent of the United States is:

1. In a screw-removing machine, a casing having a cover and provided with a depending portion terminating in a hood, a spindle journaled in and rising above the casing, it being provided at its lower extremity with a screw-engaging chuck rotatable within the hood and at its upper extremity with a collar within the cover, a gear free to turn in the casing about the spindle, means for driving the gear, and a torsion-spring connected to the gear and collar and surrounding the spindle within the cover.

2. The combination with a base, of a bracket secured to and rising above the base and having formed integrally with its upper portion a casing and with lits lower portion a hood, a motor fixed to the base and having a shaft extending into the casing, a spindle journaled in the casing, it being provided at its lower extremity with a chuck rotatable in the hood, a pinion fast upon the motor-shaft, a gear rotatable about the spindle and meshing with the pinion, and a torsion-spring connecting the gear and spindle.

ALBERT J. COCOZELLA.
ANTHONY COCOZELLA, Jr.